United States Patent
Cho (10) Patent No.: US 9,246,144 B2
(45) Date of Patent: Jan. 26, 2016

(54) BATTERY PACK AND METHOD FOR MANUFACTURING THE SAME

(71) Applicant: Samsung SDI Co., Ltd., Yongin, Gyeonggi-do (KR)

(72) Inventor: Mansik Cho, Yongin (KR)

(73) Assignee: Samsung SDI Co., Ltd., Yongin-si (KR)

( * ) Notice: Subject to any disclaimer, the term of this patent is extended or adjusted under 35 U.S.C. 154(b) by 324 days.

(21) Appl. No.: 13/787,607

(22) Filed: Mar. 6, 2013

(65) Prior Publication Data
US 2014/0127543 A1    May 8, 2014

(30) Foreign Application Priority Data

Nov. 5, 2012    (KR) .................. 10-2012-0124379

(51) Int. Cl.
*H01M 2/10*    (2006.01)
*H01M 2/34*    (2006.01)

(52) U.S. Cl.
CPC ............ *H01M 2/1016* (2013.01); *H01M 2/105* (2013.01); *H01M 2/347* (2013.01); *H01M 2220/30* (2013.01); *Y10T 29/49108* (2015.01)

(58) Field of Classification Search
CPC . H01M 2/1077; H01M 10/425; H01M 2/347; H01M 2200/00
See application file for complete search history.

(56) References Cited

U.S. PATENT DOCUMENTS

| 5,401,591 A | 3/1995 | Bishay et al. |
| 2008/0226978 A1 | 9/2008 | Kim et al. |
| 2009/0061302 A1 | 3/2009 | Scott et al. |
| 2010/0075216 A1 | 3/2010 | Yoo |
| 2010/0248004 A1 | 9/2010 | Takeshita et al. |
| 2011/0003193 A1* | 1/2011 | Park et al. ............ 429/159 |

FOREIGN PATENT DOCUMENTS

| KR | 2003-0074167 A | 9/2003 |
| KR | 2008-0084451 A | 9/2008 |
| KR | 2010-0033041 A | 3/2010 |

OTHER PUBLICATIONS

Extended European Search Report dated Dec. 16, 2013 for corresponding EP Application No. 13162544.4.

* cited by examiner

*Primary Examiner* — Stewart Fraser
*Assistant Examiner* — Olatunji Godo
(74) *Attorney, Agent, or Firm* — Knobbe Martens Olson & Bear LLP (57) ABSTRACT

A battery pack and a method for manufacturing the same are provided, which can protect a plurality battery cells from external shock or vibration by preventing the plurality battery cells from moving within a case. The battery pack includes a plurality of battery cells, a case accommodating the battery cells and including a plurality of injection holes, and a shock absorbing member integrally formed at the outside and inside of the case so as to penetrate the injection holes and supporting the battery cells.

17 Claims, 5 Drawing Sheets

BATTERY PACK AND METHOD FOR MANUFACTURING THE SAME

CROSS-REFERENCE TO RELATED APPLICATION

This application claims the benefit of Korean Patent Application No. 10-2012-0124379 filed on Nov. 5, 2012, the contents of which are incorporated herein by reference in their entirety.

BACKGROUND OF THE INVENTION

1. Field of the Invention

Aspects of the present invention relate to a battery pack and a method for manufacturing the same.

2. Description of the Related Art

Unlike primary batteries which cannot be recharged, secondary batteries can be repeatedly charged and discharged. Low capacity batteries that use single battery cells are used as power sources for various small portable electronic devices such as cellular phones and camcorders. High power batteries that use tens of battery cells connected to each other in a battery pack are used as power sources as motor driving power sources, such as electric scooters and hybrid electric vehicles.

The secondary battery can be fabricated into various shapes, such as cylindrical and prismatic shapes. A high-capacity secondary battery is composed of a plurality of unit secondary batteries which are generally connected in series. Each of the unit batteries includes an electrode assembly having a positive electrode plate and a negative electrode with a separator positioned therebetween, a case enclosing the electrode assembly, a cap assembly coupled to and sealing the case, current collectors of the positive and negative electrodes protruding to the cap assembly and provided in the electrode assembly, and positive and negative electrode terminals electrically connected to the current collectors. Therefore, the battery module includes the plurality of unit batteries spaced at predetermined intervals and connected to each other by electrode tabs in series or in parallel. The battery module is inserted into the spacer, so that the unit batteries are spaced apart from each other.

In addition, the battery module is accommodated within an external case together with an electrically connected protective circuit board, thereby forming a battery pack.

The battery pack is accommodated in the external case and the battery module can move due to external shock, so that the respective unit batteries are disconnected from each other. In addition, the unit batteries and the protective circuit board may also be disconnected from each other.

In this regard, a crack preventing member has conventionally been provided between the battery module and an inner wall of the external case to prevent the battery module from moving within the external case. In the conventional battery pack, however, the number of components may increase, resulting in an increase of the manufacturing cost, and it is quite difficult to fabricate a separate crack preventing member, lowering the manufacturability.

SUMMARY OF THE INVENTION

Aspects of the present invention provide a battery pack and a method for manufacturing the same, which can protect a plurality of battery cells from external shock or vibration by preventing the plurality of battery cells from moving within a case.

Aspects of the present invention further provide a battery pack and a method for manufacturing the same, which can reduce the manufacturing cost by reducing the number of components and the number of processing steps.

Aspects of the present invention further provide a battery pack including a plurality of battery cells, a case accommodating the battery cells and including a plurality of injection holes, and a shock absorbing member integrally formed at the outside and inside of the case so as to penetrate the injection holes and supporting the battery cells.

The shock absorbing member may include a prop unit surrounding external surfaces of the case, and a support unit formed on the prop unit so as to penetrate the injection holes.

The support unit may include a pillar unit extending from the prop unit to the inside of the case, and a cell prop unit formed on the pillar unit.

The outer wall of the pillar unit may make contact with inner walls of the plurality of injection holes.

The cell prop unit may have a first part having a cross section formed to be planar so as to contact the inner surface of the case, a second part formed at the opposite side of the first part and having a groove having a shape corresponding to the external profile of the plurality of battery cells, and a third part connecting opposite ends of the first part and the second part.

The cell prop unit may have a first part having a cross section formed to be planar so as to contact the inner surface of the case, a second part formed at the opposite side of the first part and having a groove having a shape corresponding to the external profile of the plurality of battery cells, and a third part protruding on the second part so as to partition the plurality of battery cells into unit battery cells.

The cell prop unit may have a first part having a cross section formed to be planar so as to contact the inner surface of the case and a second part formed at the opposite side of the first part and having a groove having a shape corresponding to the external profile of the plurality of battery cells.

The groove may have a semi-circular or rectangular shape.

The shock absorbing member may be made of a rubber material.

The shock absorbing member may also be made of a urethane material.

The case may be made of a flexible plastic material.

The case and the shock absorbing member may be integrally formed by a double injection process.

The case may include a first case shaped of an open box and having a plurality of fastening holes, and a second case having a plurality of fixing holes formed on its internal surface to be coupled to a fastening member penetrating the plurality of fastening holes.

The second case may include a bottom portion having the plurality of injection holes formed therein, and a sidewall portion bent and extended from edges of the bottom portion and having the plurality of fixing holes formed therein.

The sidewall portion may have a plurality of projecting pillars inwardly protruding and having the plurality of fixing holes formed therein.

A coupling groove may be formed on the outer surface of the second case so as to be connected to the shock absorbing member.

According to aspects of the present invention, there is provided a method for manufacturing a battery pack, the method including forming a case including a plurality of injection holes by an injection molding process, and forming a shock absorbing member penetrating the injection holes at the outside and inside of the case by an injection molding process, wherein the case and the shock absorbing member are integrally formed by a double injection process.

As described above, in the battery pack and the method for manufacturing the same according to an embodiment of the present invention, a plurality of battery cells can be protected from external shock or vibration by providing a shock absorbing member integrally formed inside and outside of a case accommodating the plurality of battery cells, thereby preventing the plurality of battery cells from moving within the case.

In addition, a case and a shock absorbing member are integrally formed by a double injection forming process, thereby reducing the manufacturing cost by reducing the number of components and the number of processing steps.

Additional aspects and/or advantages of the invention will be set forth in part in the description which follows and in part will be obvious from the description or may be learned by practice of the invention.

BRIEF DESCRIPTION OF THE DRAWINGS

The aspects, features and advantages of the present invention will be more apparent from the following detailed description in conjunction with the accompanying drawings, in which.

DETAILED DESCRIPTION OF THE INVENTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Figure 1:
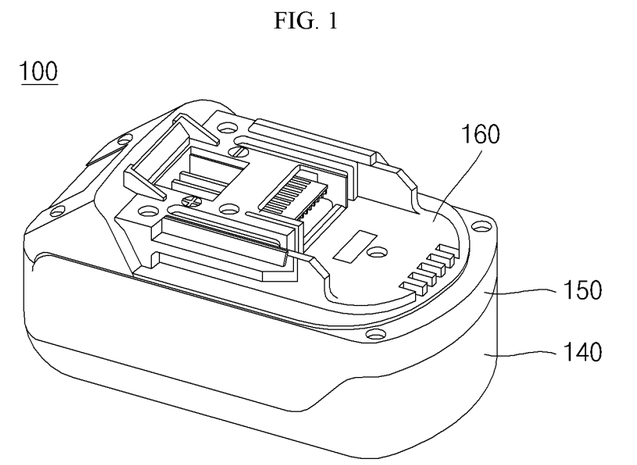
FIG. 1 is a perspective view of a battery pack according to an embodiment present invention.
Figure 2:
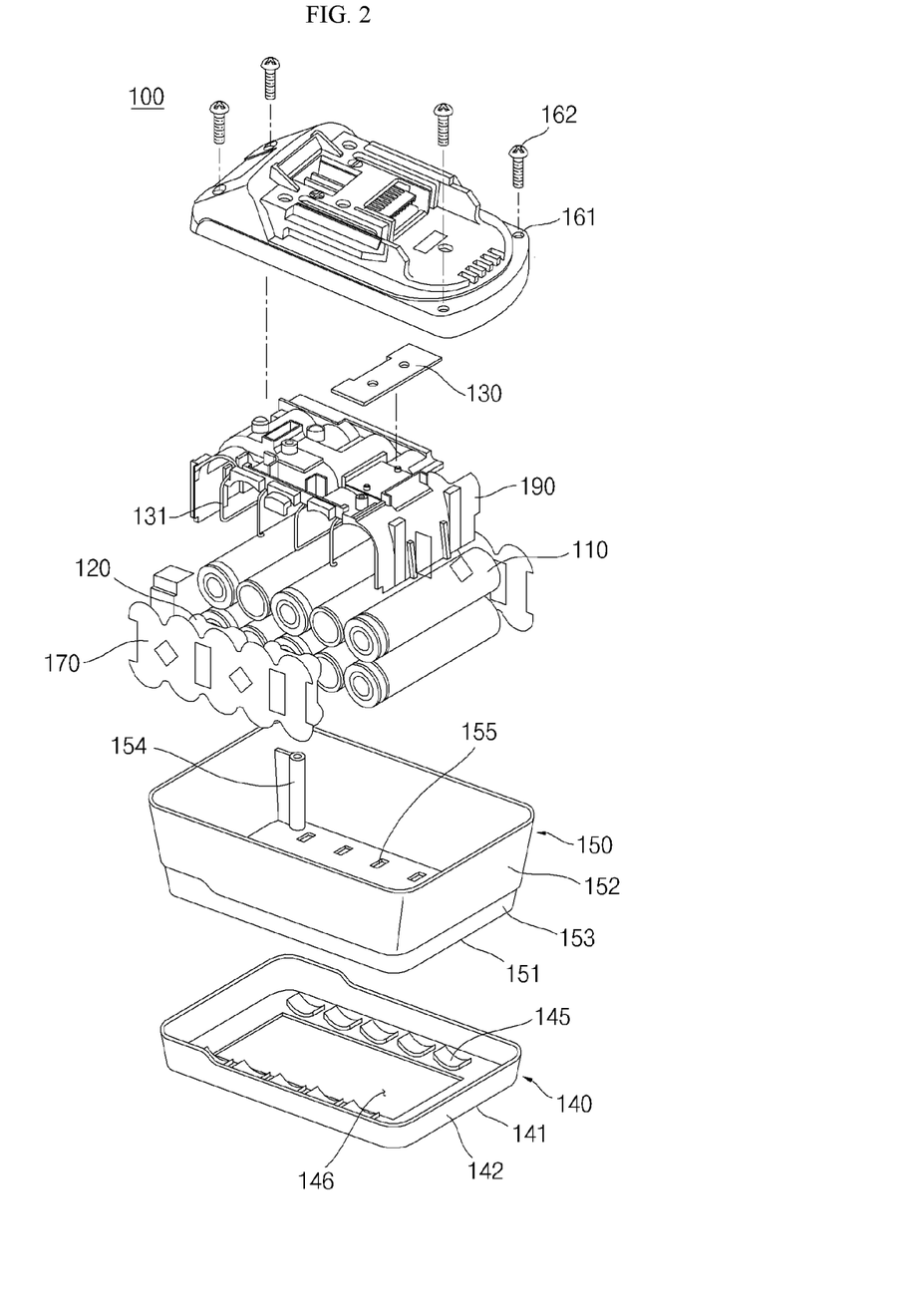
FIG. 2 is an exploded perspective view of the battery pack shown in FIG. 1.
Figure 3A:
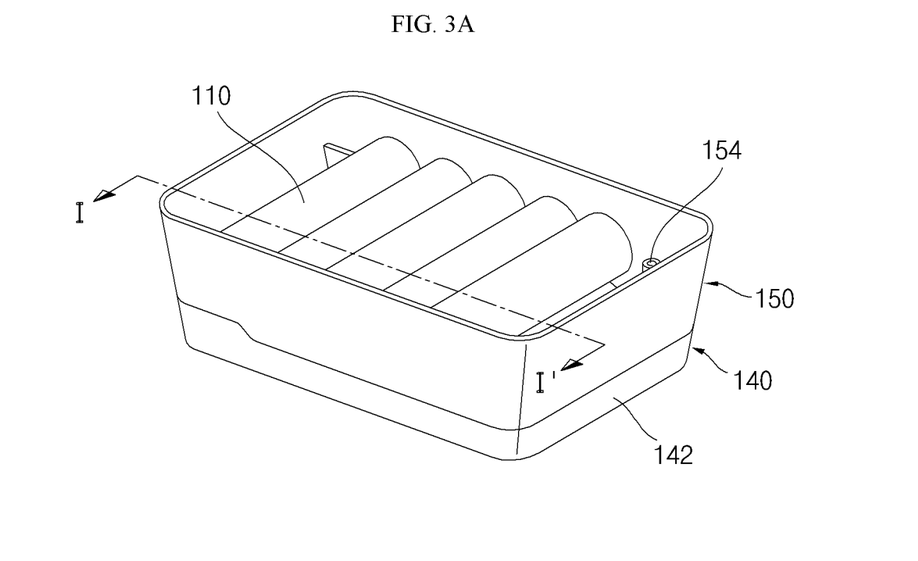
FIG. 3A is a perspective view illustrating a state in which a plurality of battery cells are accommodated in a lower case with a shock absorbing member of FIG. 2 coupled thereto.
Figure 3B:
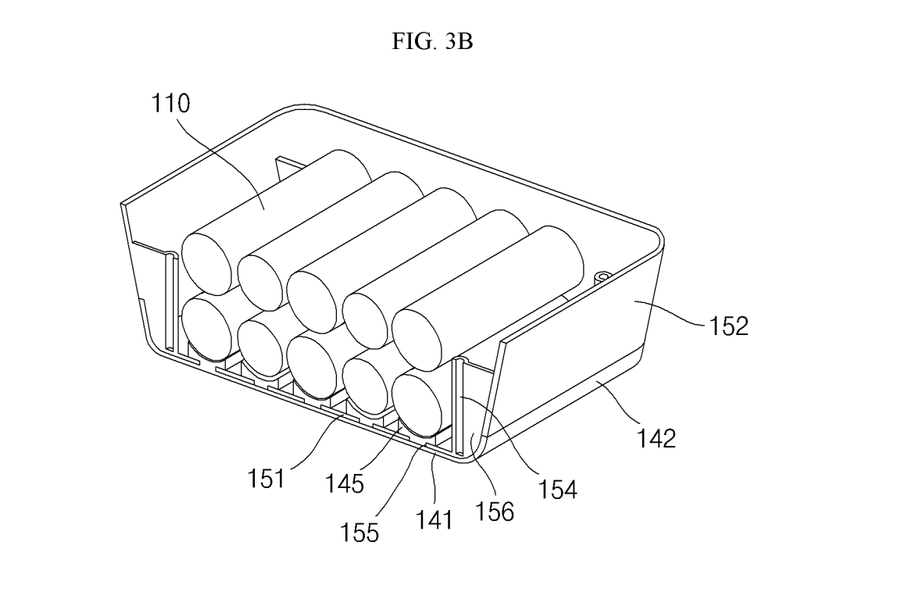
FIG. 3B is a partially cross-sectional view taken along the line I-I' of FIG. 3A.
Figure 4:
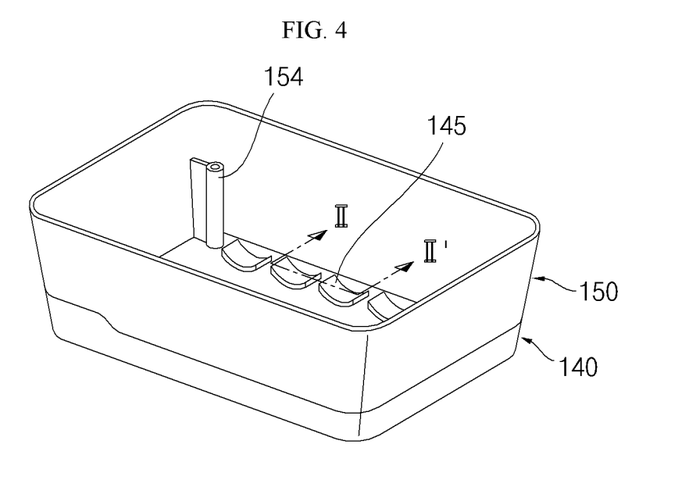
FIG. 4 is a perspective view illustrating a lower case of FIG. 2.
Figure 5:
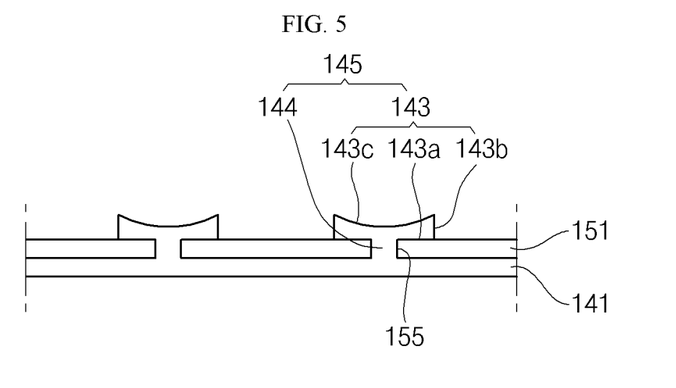
FIG. 5 is a cross-sectional view taken along the line II-II' of FIG. 4.
Figure 6:
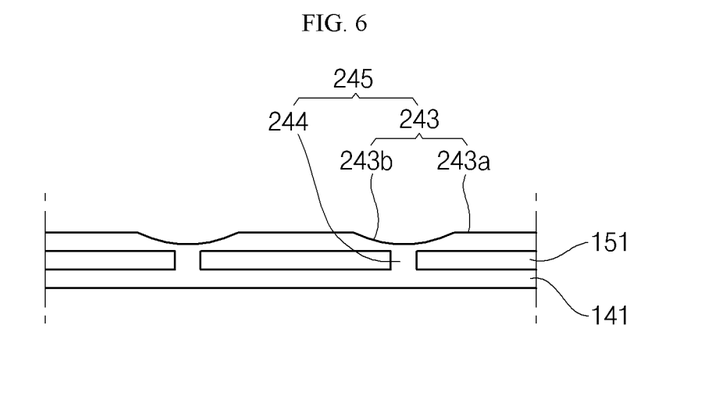
FIG. 6 is a cross-sectional view illustrating another embodiment of a shock absorbing member of FIG. 5.
Figure 7:
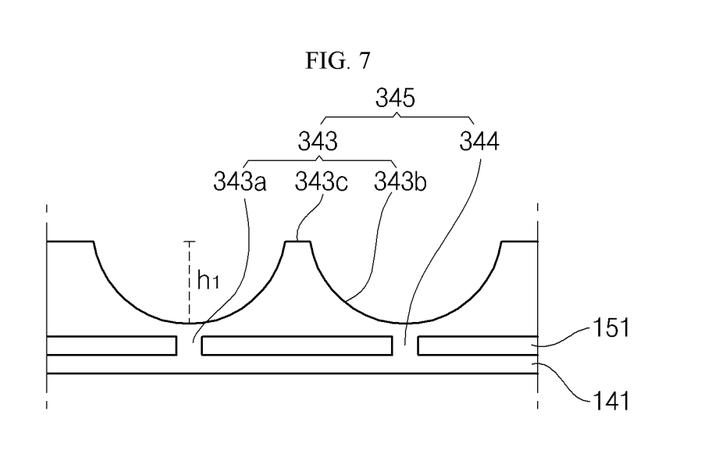
FIG. 7 is a cross-sectional view illustrating still another embodiment of a shock absorbing member of FIG. 5.

FIG. 1 is a perspective view of a battery pack according to an embodiment present invention, FIG. 2 is an exploded perspective view of the battery pack shown in FIG. 1, FIG. 3A is a perspective view illustrating a state in which a plurality of battery cells are accommodated in a lower case with a shock absorbing member of FIG. 2 coupled thereto, and FIG. 3B is a partially cross-sectional view taken along the line I-I' of FIG. 3A, FIG. 4 is a perspective view illustrating a lower case of FIG. 2, FIG. 5 is a cross-sectional view taken along the line II-II' of FIG. 4, FIG. 6 is a cross-sectional view illustrating another embodiment of a shock absorbing member of FIG. 5, and FIG. 7 is a cross-sectional view illustrating still another embodiment of a shock absorbing member of FIG. 5.

Referring to FIGS. 1 to 7, the battery pack 100 according to an embodiment of the present invention includes a plurality of battery cells 110, electrode tabs 120 connecting the plurality of battery cells 110 in series or in parallel, cases 150 and 160 in which the battery cells 110 and the electrode tabs 120 are accommodated, and a shock absorbing member 140 integrally formed outside and inside the cases 150 and 160 and supporting the battery cells 110. In addition, the battery pack 100 includes a protective circuit board 130 for protecting the battery cells 110 when the battery cells 110 are over-charged or over-discharged, and lead wires 131 electrically connecting the battery cells 110 to the protective circuit board 130. In addition, the battery pack 100 further includes an insulating tape 170 adhered to outer surfaces of the electrode tabs 120, and a holder 190 coupled to top portions of the battery cells 110 to install the protective circuit board 130.

The plurality of battery cells 110 are cylindrical batteries. The battery cells 110 include five battery cells arranged in a line and the five batteries are arranged in a stack of two layers. The battery cells 110 are installed such that neighboring battery cells have different polarities. That is to say, a battery cell having a positive (+) polarity at one end and a battery cell having a negative (−) polarity at the one end are arranged to be adjacent to each other.

The electrode tabs 120 connect 2 or 4 neighboring unit batteries among the battery cells 110 in series to each other. The electrode tabs 120 are welded to positive (+) or negative (−) electrodes of the battery cells 110 at four corners or both ends. The electrode tabs 120 are made of a highly conductive metal. That is to say, the electrode tabs 120 are made of at least one metal selected from the group consisting of nickel, aluminum, copper and silver. However, the present invention does not limit the materials of the electrode tabs 120 to those listed herein.

The protective circuit board 130 includes a protective circuit (not shown) for protecting the plurality of battery cells 110 during over-charge/over-discharge or an electric device (not shown) mounted thereon.

The lead wires 131 are drawn from the protective circuit board 130 and connect the plurality of battery cells 110 to the protective circuit or the electric device. In addition, the lead wires 131 are fixedly installed at their portions connected to the electrode tabs.

The cases 150 and 160 include a lower case 150, a shock absorbing member 140 and an upper case 160. Meanwhile, the cases 150 and 160 may be made of a plastic material, but the present invention does not limit materials of the cases 150 and 160 thereto.

The lower case 150 is shaped of an open box to allow the plurality of battery cells 110, the electrode tabs 120 and the protective circuit board 130 to be housed therein. The lower case 150 includes a bottom portion 151 and a sidewall portion 152 having four sidewalls upwardly extending from the respective sides of the bottom portion 151.

The bottom portion 151 is formed to be planar and has a plurality of injection holes 155 formed at its edge portions. The plurality of injection holes 155 are formed along the edge portions of the bottom portion 151 to be spaced apart from each other.

The sidewall portion 152 is formed such that its sidewalls are tilted with respect to the bottom portion 151. That is to say, the sidewall portion 152 is formed to be outwardly tilted toward its upper portion. In addition, a plurality of projecting pillars 156 are formed inside the sidewall portion 152 so as to inwardly protrude. A plurality of fixing holes 154 are formed in the plurality of projecting pillars 156. The plurality of fixing holes 154 are located to correspond to the plurality of fastening holes 161 formed in the upper case 160. In an exemplary embodiment, the plurality of fixing holes 154 may be formed in the projecting pillars 156 protruding at the respective corner regions of the lower case 150. In addition, a coupling groove 153 is formed on the outer surface of the bottom portion 151 and the sidewall portion 152 so as to be connected to the shock absorbing member 140.

The shock absorbing member 140 is integrally formed at the outside and inside of the lower case 150 so as to penetrate the injection holes 155 of the lower case 150, thereby supporting the battery cells 110. The shock absorbing member 140 includes a prop unit 141 surrounding the outer surface of the lower case 150, a sidewall portion 142 upwardly extending from edge portions of the prop unit 141, and a plurality of support units 145 formed on the prop unit 141 so as to penetrate the injection holes 155. The prop unit 141 includes an opening hole 146 formed inside the plurality of support units 145.

Each of the support units 145 includes a pillar unit 144 extending from the prop unit 141 toward the inside of the lower case 150, and a cell prop unit 143 formed on the pillar unit 144. The outer wall of the pillar unit 144 contacts the inner walls of the injection holes 155.

As shown in FIG. 5, the cell prop unit 143 has a first part 143a having a cross section formed to be planar so as to contact the inner surface of the lower case 150, a second part 143c formed at the opposite side of the first part 143a and having a groove having a shape corresponding to the external profile of each of the plurality of battery cells 110, and a third part 143b connecting opposite ends of the first part 143a and the second part 143c. That is to say, the cell prop unit 143 is located to correspond to each of the plurality of battery cells 110 so as to be spaced apart from each other. External shock or vibration applied from the pillar unit 144 to the plurality of battery cells 110 housed inside the lower case 150 and mounted on a top surface of the cell prop unit 143 may be absorbed by the cell prop unit 143, thereby preventing the battery cells 110 from moving in the lower case 150.

In addition, as shown in FIG. 6, the cell prop unit 243 of another embodiment has a first part 243a having a cross section formed to be planar so as to contact the inner surface of the lower case 150 and a second part 243b formed at the opposite side of the first part 243a and having a groove having a shape corresponding to the external profile of each of the plurality of battery cells 110. That is to say, the cell prop unit 243 has grooves located to correspond to the plurality of battery cells 110 so as to be spaced apart from each other. External shock or vibration applied from the pillar unit 244 to the plurality of battery cells 110 housed inside the lower case 150 and mounted on a top surface of the cell prop unit 243 may be absorbed by the cell prop unit 243, thereby preventing the battery cells 110 from moving in the lower case 150.

In addition, as shown in FIG. 7, the cell prop unit 343 of another embodiment has a first part 343a having a cross section formed to be planar so as to contact the inner surface of the case, a second part 343b formed at the opposite side of the first part 343a and having a groove having a shape corresponding to the external profile of each of the plurality of battery cells 110, and a third part 143c protruding on the second part so as to partition the plurality of battery cells 110 into unit battery cells. That is to say, the cell prop unit 343 includes the third part 343c partitioning the second part 343b and its neighboring second part. The plurality of battery cells 110 housed in the lower case 150 and mounted on a top surface of the cell prop unit 343 are partitioned by the cell prop unit 343, thereby preventing the plurality of battery cells 110 from moving in the lower case 150.

Here, the groove formed in the second part 143c, 243b or 343b is formed to correspond to the external profile of each of the plurality of battery cells 110. For example, the groove formed in the second part 143c, 243b or 343b is formed at 5 sections corresponding to the number of the plurality of battery cells 110 forming the external profile.

In addition, the groove formed in the second part 143c, 243b or 343b has a semi-circular or rectangular shape. Therefore, it is possible to prevent the battery cells 110 mounted in the grooves from outwardly deviating from the grooves. In addition, the groove may be formed to have a depth (specifically, h1) corresponding to 15% to 40% of the inner diameter of each of the battery cells 110. If the depth of the groove is not greater than 15% of the inner diameter of each of the battery cells 110, the battery cell 110 mounted in the groove may deviated from the groove. If the depth of the groove is greater than 40% of the inner diameter of each of the battery cells 110, interference may occur between the shock absorbing member 140 and each of the plurality of battery cells 110 mounted thereon when stacking the battery cells 110.

Meanwhile, the shock absorbing member 140 is made of a compressible or resilient material, such as rubber material. In addition, the shock absorbing member 140 may be made of a urethane material. In addition, the shock absorbing member 140 may also be made of a flexible plastic material. Examples of the flexible plastic material may include at least one material selected from the group consisting of polyethylene (PE), polypropylene (PP), polyvinyl chloride (PVC), compressed polystyrene (CPS), polyethylene terephthalate (PETE) and equivalents thereof. These materials are capable of supporting and protecting a target object while absorbing shocks applied to the target object.

The shock absorbing member 140 and the lower case 150 may be integrally formed by double injection. That is to say, the shock absorbing member 140 is formed by forming the case 150 having the injection holes 155 by an injection molding process, placing the lower case 150 in a mold (not shown) and supplying an injection material of rubber or urethane to the mold. The injection material is supplied to the mold having the lower case 150 placed therein, thereby forming the shock absorbing member 140 integrally formed with the outside and inside of the lower case 150 through the injection holes 155.

The upper case 160 is shaped and sized to seal the open top portion of the lower case 150. That is to say, the upper case 160 is shaped of a cover plate covering a box-shaped lower case 150. In addition, a plurality of fastening holes 161 are formed at edge portions of the upper case 160 to be located to correspond to the fixing holes 154 formed on inner walls of the lower case 150. The fixing holes 154 are coupled to the fastening holes 161 while fastening members 162, such as bolts or screws, penetrate the fastening holes 161. Therefore, the upper case 160 and the lower case 150 are fixedly coupled to each other by the while fastening members 162 penetrating the fastening holes 161.

The insulating tape 170 is adhered to regions between the electrode tabs 120 and the lower case 150 and protects the electrode tabs 120.

The holder 190 surrounds top and side surfaces of the battery cells 110 and protect the battery cells 110 from external shocks.

An assembling method of the aforementioned battery pack according to an embodiment of the present invention will now be described.

Figure 8:
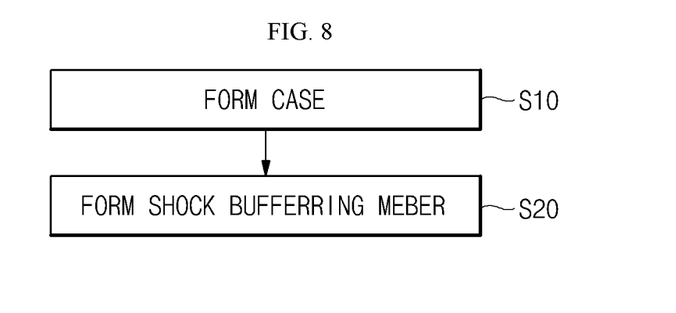
FIG. 8 is a flowchart illustrating a method for manufacturing a battery pack according to an embodiment present invention.

FIG. 8 is a flowchart illustrating a method for manufacturing a battery pack according to an embodiment present invention.

Referring to FIG. 8, the method for manufacturing the battery pack according to an embodiment present invention includes forming a case (S10) and forming a shock absorbing member (S20). Here, the case and the shock absorbing member are integrally formed by an injection molding process (specifically, a double injection process) in each of the case forming step (S10) and the shock absorbing member forming step (S20).

In detail, the lower case 150 is first formed on the bottom portion 151 having the plurality of injection holes 155. Then, the lower case 150 is placed in a predetermined mold and an injection material (i.e., rubber or urethane) is supplied to a lower portion of the lower case 150. The injection material is supplied from the outside of the lower case 150 so as to penetrate the injection holes 155. As a result, a prop unit 151 surrounding the outer surface of the lower case 150 is formed outside the lower case 150, and the support units 145 supporting the plurality of battery cells 110 are formed inside the lower case 150.

Thereafter, the plurality of battery cells 110 are mounted in the support units 145 of the lower case 150. That is to say, the plurality of battery cells 110 are mounted on the cell prop unit 143 such that the battery cells 110 having opposite polarities are positioned to be adjacent to each other. Since the plurality of battery cells 110 mounted on the cell prop unit 143 are supported by the cell prop unit 143, they can be prevented from moving even by external shock or vibration applied thereto from the outside of the cases 150 and 160.

Each of the electrode tabs 120 is welded to opposite ends of at least two bare cells (or four bare cells) among the plurality of bare cells 110. Therefore, the plurality of bare cells 110 welded by the electrode tabs 120 are connected to each other in series or in parallel.

The insulating tape 170 is adhered to the outer surfaces of the electrode tabs 120. The insulating tape 170 is shaped to correspond to the electrode tabs 120 and protects the electrode tabs 120.

The holder 190 is assembled to top portions of the plurality of bare cells 110. The holder 190 is assembled to surround the top and side surfaces of the plurality of bare cells 110.

In addition, the protective circuit board 130 is installed on a top surface of the holder 190. The plurality of lead wires 141 are drawn out from the protective circuit board 130. The lead wires 141 are connected to the respective bare cells 110. The lead wires 141 drawn out from the protective circuit board 130 are connected to the electrode tabs 120 welded to the bare cells 110.

The plurality of bare cells 110 are mounted in the cell prop unit 143, and the electrode tabs 120 and the protective circuit board 130 are connected thereto, thereby forming the battery module, which is then housed in the lower case 150. Since the battery module is mounted on the cell prop unit 143 of the lower case 150, the lower case 150 can be protected against collision with the bottom portion 151.

Finally, the upper case 160 is fastened to a top portion of the lower case 150 using the fastening members 162, such as bolts or screws, thereby completing the assembling of the battery pack 100.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A battery pack comprising:
   battery cells;
   a case accommodating the battery cells and including a plurality of injection holes; and
   a shock absorbing member integrally formed at the outside and inside of the case so as to penetrate the injection holes and supporting the battery cells,
   wherein the shock absorbing member includes a prop unit surrounding external surfaces of the case, a pillar unit extending from the prop unit to the inside of the case so as to penetrate the injection holes, and a cell prop unit formed on the pillar unit.

2. The battery pack of claim 1, wherein the outer wall of the pillar unit makes contact with inner walls of the plurality of injection holes.

3. The battery pack of claim 1, wherein the cell prop unit has a first part having a cross section formed to be planar so as to contact the inner surface of the case, a second part formed at the opposite side of the first part and having a groove having a shape corresponding to the external profile of the plurality of battery cells, and a third part connecting opposite ends of the first part and the second part.

4. The battery pack of claim 1, wherein the cell prop unit has a first part having a cross section formed to be planar so as to contact the inner surface of the case, a second part formed at the opposite side of the first part and having a groove having a shape corresponding to the external profile of the plurality of battery cells, and a third part protruding on the second part so as to partition the plurality of battery cells into unit battery cells.

5. The battery pack of claim 1, wherein the cell prop unit has a first part having a cross section formed to be planar so as to contact the inner surface of the case and a second part formed at the opposite side of the first part and having a groove having a shape corresponding to the external profile of the plurality of battery cells.

6. The battery pack of claim 3, wherein the groove has a semi-circular or rectangular shape.

7. The battery pack of claim 1, wherein the shock absorbing member is made of a rubber material.

8. The battery pack of claim 1, wherein the shock absorbing member is made of a urethane material.

9. The battery pack of claim 1, wherein the case is made of a flexible plastic material.

10. The battery pack of claim 1, wherein the case and the shock absorbing member are integrally formed by a double injection process.

11. The battery pack of claim 1, wherein the case includes a first case shaped of an open box and having a plurality of fastening holes, and a second case having a plurality of fixing holes formed on its internal surface to be coupled to a fastening member penetrating the plurality of fastening holes.

12. The battery pack of claim 11, wherein the second case includes a bottom portion having the plurality of injection holes formed therein, and a sidewall portion bent and extended from edges of the bottom portion and having the plurality of fixing holes formed therein.

13. The battery pack of claim 12, wherein the sidewall portion has a plurality of projecting pillars inwardly protruding and having the plurality of fixing holes formed therein.

14. The battery pack of claim 11, wherein a coupling groove is formed on the outer surface of the second case so as to be connected to the shock absorbing member.

15. A battery pack comprising:

battery cells;

a case accommodating the battery cells, the case having a first surface with a plurality of injection openings that correspond to the plurality of battery cells;

a shock absorbing member that is formed so as to have a plurality of curved receiving members that receives the battery cells, a prop unit that is positioned about the first surface of the case and a plurality of pillar units that interconnect the plurality of curved receiving members to the prop unit, wherein the prop unit surrounds external surfaces of the case, wherein the plurality of pillar units extend from the prop unit to the inside of the case so as to penetrate the injection holes, wherein the plurality of curved receiving members are formed on the plurality of pillar units, wherein the shock absorbing member is formed of a resilient, compressible material and the plurality of curved receiving members, plurality of pillar members and the prop unit are formed as a continuous member.

16. The battery pack of claim 1, wherein the plurality of curved receiving members are spaced from each other.

17. The battery pack of claim 15, wherein the shock absorbing member is formed of rubber.

\* \* \* \* \*